United States Patent
Vasudeva et al.

(10) Patent No.: US 12,099,606 B2
(45) Date of Patent: *Sep. 24, 2024

(54) SYSTEMS AND METHODS FOR PROTECTING AGAINST MALWARE ATTACKS

(71) Applicant: NetApp, Inc., San Jose, CA (US)

(72) Inventors: Jagadish Vasudeva, Shimoga (IN); Prateeksha Varshney, Ghaziabad (IN); Priya Sehgal, Pune (IN); Mrinal K. Bhattacharjee, Bangalore (IN); Amit Valjibhai Panara, Bangalore (IN); Siddhartha Nandi, Bangalore (IN)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,714

(22) Filed: Sep. 11, 2023

(65) Prior Publication Data

US 2024/0111870 A1    Apr. 4, 2024

Related U.S. Application Data

(63) Continuation of application No. 17/935,689, filed on Sep. 27, 2022, now Pat. No. 11,755,736, which is a (Continued)

(30) Foreign Application Priority Data

Apr. 24, 2020   (IN) .............................. 202041017587

(51) Int. Cl.
G06F 21/56    (2013.01)
G06F 21/54    (2013.01)
(Continued)

(52) U.S. Cl.
CPC ............ G06F 21/566 (2013.01); G06F 21/54 (2013.01); G06F 21/568 (2013.01); G06F 21/577 (2013.01); G06F 21/602 (2013.01)

(58) Field of Classification Search
CPC ...... G06F 21/56; G06F 21/566; G06F 21/577; G06F 21/602; G06F 21/568; G06F 21/54; H04N 2201/3202
See application file for complete search history.

(56) References Cited

U.S. PATENT DOCUMENTS 6,886,099 B1    4/2005    Smithson et al.
8,839,435 B1    9/2014    King
(Continued)

OTHER PUBLICATIONS

Feng, Pengbin, et al. "A novel dynamic android malware detection system with ensemble learning." IEEE Access 6 (2018): 30996-31011. (Year: 2018).*

(Continued)

*Primary Examiner* — Theodore C Parsons
*Assistant Examiner* — Sameera Wickramasuriya
(74) *Attorney, Agent, or Firm* — HAYNES AND BOONE, LLP

(57) ABSTRACT

A method, computing device, and non-transitory machine-readable medium for detecting malware attacks and mitigating data loss. In various embodiments, an agent is implemented in the operating system of a storage node to provide protection at the bottommost level in a data write path. The agent intercepts write requests and observes file events over time to detect anomalous behavior. For example, the agent may monitor incoming write requests and, when an incoming write request is detected, determine whether the file is associated with a malware attack risk based on an analysis of an encryption state of data in the file.

20 Claims, 7 Drawing Sheets

Related U.S. Application Data continuation of application No. 16/942,123, filed on Jul. 29, 2020, now Pat. No. 11,475,132.

(51) Int. Cl.
  *G06F 21/57* (2013.01)
  *G06F 21/60* (2013.01)

(56) References Cited

U.S. PATENT DOCUMENTS

| | | | |
|---|---|---|---|
| 8,955,038 B2 | 2/2015 | Nicodemus et al. | |
| 9,323,930 B1 | 4/2016 | Satish | |
| 9,734,337 B1 | 8/2017 | Patton et al. | |
| 9,813,443 B1 | 11/2017 | Subramanian | |
| 10,229,269 B1* | 3/2019 | Patton | G06F 21/554 |
| 10,409,986 B1 | 9/2019 | Natanzon et al. | |
| 10,454,950 B1 | 10/2019 | Aziz | |
| 11,019,095 B2 | 5/2021 | Grill et al. | |
| 11,475,132 B2 | 10/2022 | Vasudeva et al. | |
| 2003/0110280 A1 | 6/2003 | Hinchliffe et al. | |
| 2003/0126449 A1 | 7/2003 | Kelly et al. | |
| 2007/0143851 A1 | 6/2007 | Nicodemus et al. | |
| 2008/0177994 A1 | 7/2008 | Mayer | |
| 2014/0013112 A1 | 1/2014 | Cidon et al. | |
| 2017/0034189 A1 | 2/2017 | Powell | |
| 2018/0075234 A1 | 3/2018 | Boutnaru | |
| 2018/0114020 A1 | 4/2018 | Hirschberg et al. | |
| 2018/0288074 A1 | 10/2018 | Thayer et al. | |
| 2018/0322286 A1 | 11/2018 | Diehl et al. | |
| 2019/0235973 A1 | 8/2019 | Brewer et al. | |
| 2019/0332769 A1* | 10/2019 | Fralick | H04L 9/30 |
| 2020/0042703 A1 | 2/2020 | Herman Saffar et al. | |
| 2020/0099699 A1 | 3/2020 | Saad | |
| 2020/0125727 A1* | 4/2020 | Wu | G06F 40/289 |
| 2021/0185084 A1 | 6/2021 | Sodja et al. | |

OTHER PUBLICATIONS

Alotaibi D.A., et al., "Machine Learning Based on Malware Detection in Mobile Networks," Science International, 2019, vol. 31(3), pp. 501-511.

Bazrafshan Z., et al., "A Survey on Heuristic Malware Detection Techniques," The 5th Conference on Information and Knowledge Technology, 2013, pp. 113-120.

Chen, Q, and Bridges, R.A., "Automated Behavioral Analysis of Malware: A Case Study of WannaCry Ransomware," 16th IEEE International Conference on Machine Learning and Applications (ICMLA), 2017, pp. 454-460.

Fan Y., et al., "Software Malicious Behavior Analysis Model based on System Call and Function Interface," 2019 IEEE 9th Annual International Conference on CYBER Technology in Automation, Control, and Intelligent Systems (CYBER), IEEE, 2019, pp. 59-64.

Notice of Allowance mailed on Apr. 21, 2023 for U.S. Appl. No. 17/935,689, filed Sep. 27, 2022, 10 pages.

* cited by examiner

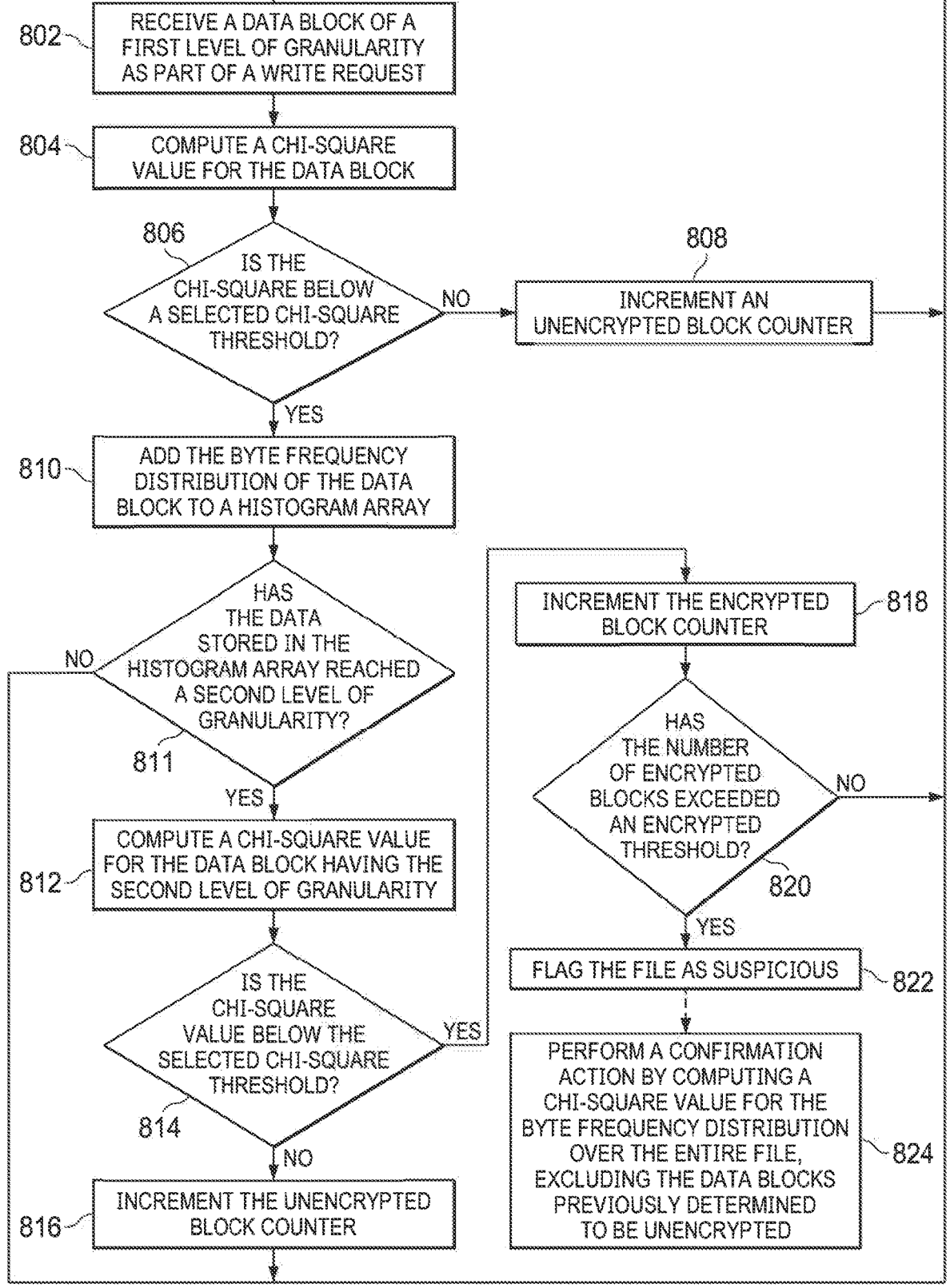

SYSTEMS AND METHODS FOR PROTECTING AGAINST MALWARE ATTACKS

CROSS-REFERENCE TO RELATED APPLICATIONS

This application is a Continuation of U.S. patent application Ser. No. 17/935,689 filed Sep. 27, 2022, which is a Continuation of U.S. patent application Ser. No. 16/942,123 filed Jul. 29, 2020, which claims priority to Indian Patent Application No. 202041017587 filed Apr. 24, 2020, the disclosures of which are incorporated herein by reference in their entireties.

TECHNICAL FIELD

The present description relates to data security, and more specifically, to systems and methods for detecting malicious software attacks and mitigating data loss associated with such malicious software attacks.

BACKGROUND

Malicious software (malware) may be any software designed to cause damage to a computer, server, client, or computer network. There are a variety of different types of malware including, for example, but not limited to, computer viruses, worms, ransomware, spyware, Trojan horses, and adware. Ransomware is a type of malware that threatens to publish or otherwise make publicly available a victim's data or blocks access to that data unless or until a ransom is paid. The victim may be an individual person, an organization, a business enterprise, or some other type of entity.

In a typical scenario, ransomware encrypts the data in one or more files on a computer or server and prompts a user to pay the ransom amount to be able to decrypt or retrieve the user's data. Oftentimes, the encrypted data is stored in a new file with the encryption key being stored on a different server from the encrypted files and the original file being deleted. In some cases, the original file is overwritten with the encrypted data. Further, ransomware may also make it difficult to preserve snapshots of the original data (the data prior to encryption by the malware). For example, certain recycle settings may cause an older snapshot (e.g., a previously generated snapshot) to be deleted when a newer one is generated so that the overall number of snapshots being maintained is constant or maintained below a threshold. Some ransomware may be configured to run slowly over several days, weeks, or even months to ensure that any snapshots with the original data are deleted. Because a ransomware attack can result in significant data loss and monetary loss, it is important to be able to detect such attacks and mitigate losses.

BRIEF DESCRIPTION OF THE DRAWINGS

The present disclosure is best understood from the following detailed description when read with the accompanying figures.

FIG. 8 is a flow diagram of a process for determining whether a file is suspicious in accordance with one or more example embodiments.

DETAILED DESCRIPTION

Figure 1:
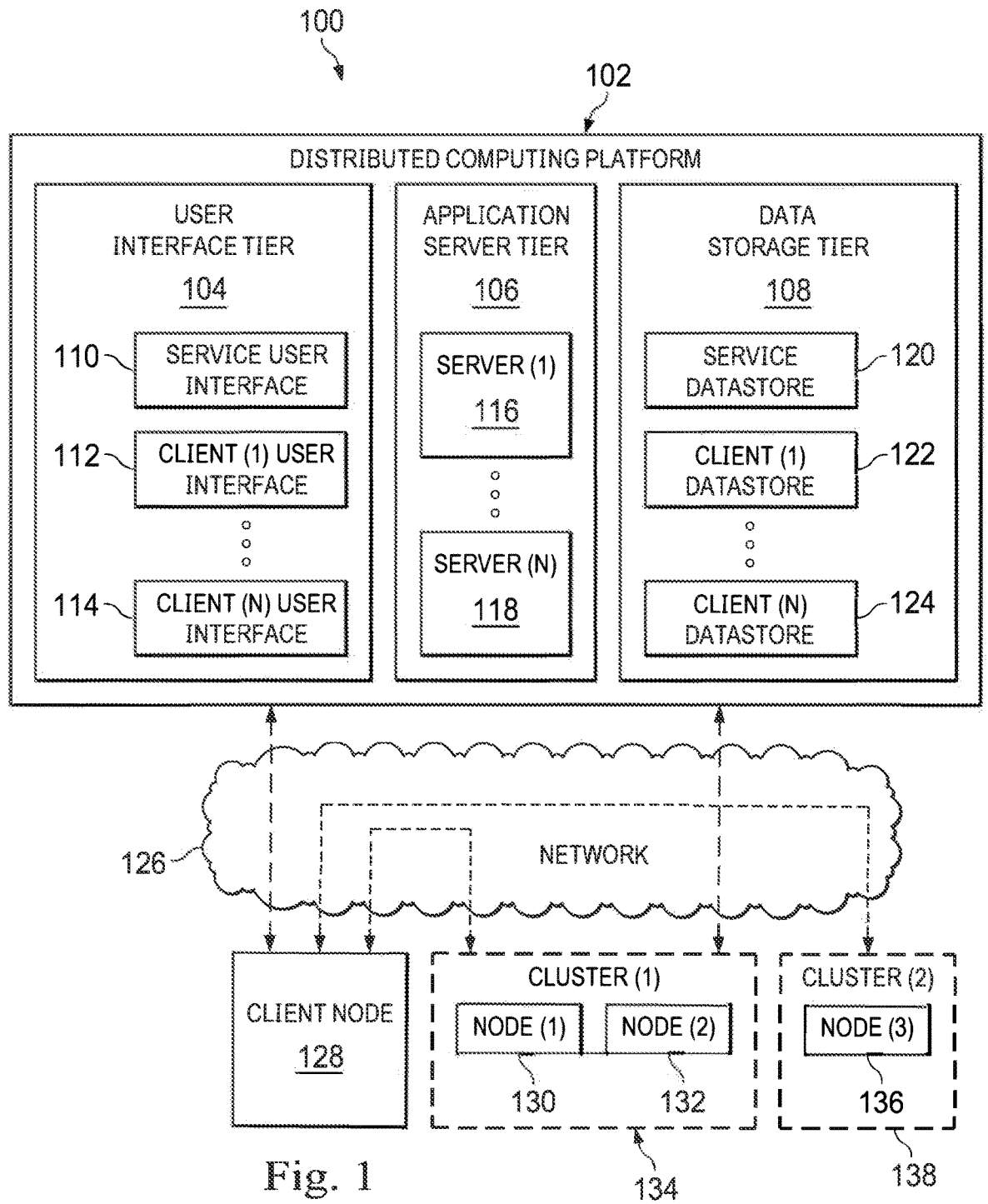
FIG. 1 is a block diagram illustrating a computing environment in accordance with one or more example embodiments.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

Various embodiments include methods, systems, and machine-readable media for quickly and easily detecting malware attacks (e.g., ransomware attacks) and mitigating data loss. In one or more embodiments, an agent, which may be referred to as a protection agent, is implemented in the operating system of a storage node (e.g., a storage array) such that protection is provided at the bottommost or lowest level in the data write path. The protection agent may intercept write requests and observe file events over time to detect anomalous behavior. The protection agent can quickly identify when files that are being requested to be written to the storage node are suspicious and can generate a snapshot of at least a portion of the storage node (e.g., a volume of the storage node to which the file was to be written) in response to detecting suspicious files. A suspicious file may be a file that is associated with a malware attack risk. In other words, a suspicious file may be a file that is potentially associated with a malware attack, with the potential association being identified according to embodiments of the present disclosure. The snapshot may occur outside of preselected intervals for generating snapshots and, in some cases, may occur after a provisional detection of a malware attack but before final confirmation of the malware attack is provided.

For example, the protection agent may use chi-square computations to determine whether the data in a file is encrypted and then ultimately determine whether that file is encrypted (i.e., created by a malware attack). When the number of files that are determined to be encrypted exceeds a threshold, the protection agent may determine that a malware attack is underway. In some cases, the protection agent relies on pattern analysis (e.g., pattern recognition analytics) to analyze file activity over time to determine whether a malware attack is underway. When the protection agent detects (e.g., determines that the activity over time meets the threshold or other metric) that a malware attack is underway, an administrator (e.g., a storage administrator) or some other user is notified via, for example, an alert that is presented to the administrator or user via a user interface. The protection agent may also present options for data recovery to the administrator or user.

Thus, the methods, systems, and machine-readable media described herein enable early detection of malware attacks, such as ransomware attacks, as well as data loss mitigation via special snapshot creation and/or notification of the detected malware attacks.

FIG. 1 is a diagram illustrating a computing environment 100 in accordance with one or more example embodiments. In one example, the techniques described herein may include actions implemented within a client node 128, which may take the form of, for example, a laptop, a tablet, a personal computer, a mobile device, a server, a virtual machine, a wearable device, or some other type of client device. In another example, the techniques described herein may include actions implemented within one or more nodes, such as a first node 130 and/or a second node 132 within a first cluster 134, a third node 136 within a second cluster 138, or some other combination of nodes (such as discussed with respect to FIG. 3 in which a protection agent runs within an operating system of a storage node). A node may comprise a storage controller, a server, an on-premise device, a virtual machine such as a storage virtual machine, hardware, software, or combination thereof. The one or more nodes may be configured to manage the storage and access to data on behalf of the client node 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein include actions implemented across one or more of the client node 128, the one or more nodes 130, 132, and/or 136, and/or the distributed computing platform 102. For example, the client node 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein include actions implemented by a storage operating system or are implemented by a separate module that interacts with the storage operating system. The storage operating system may be hosted by the client node 128, the distributed computing platform 102, or across a combination thereof. In an example, the storage operating system may execute within a storage virtual machine, a hyperscaler, or some other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write-anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks, and inodes are used to identify files and file attributes such as creation time, access permissions, size and block location, etc.).

In an example, deduplication may be implemented by a deduplication module associated with the storage operating system to improve storage efficiency. For example, inline deduplication may ensure blocks are deduplicated before being written to a storage device. Inline deduplication uses a data structure, such as an in-core hash store, which maps fingerprints of data-to-data blocks of the storage device storing the data. Whenever data is to be written to the storage device, a fingerprint of that data is calculated, and the data structure is looked up using the fingerprint to find duplicates (e.g., potentially duplicate data already stored within the storage device). If duplicate data is found, then the duplicate data is loaded from the storage device and a byte-by-byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the computing environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client node 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client node 128 for the write operation until the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the computing environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120. Further, the data storage tier 108 may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, logical unit numbers (LUNs), or other logical organizations of data that can be defined across one or more physical storage devices. In another example, the first node 130 transmits and stores all client data to the distributed computing platform 102. In yet another example, the client node 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client node 128, within the first node 130, or within the distributed computing platform 102 such as by the application server tier 106. In another example, one or more SVMs may be hosted across one or more of the client node 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client node 128 and/or the first node 130 over the network 126. The SVM executes a storage application and/or an instance of the storage operating system to process the operations and/or store the data within the client (1) data store 122. The SVM may transmit a response back to the client node 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client node 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client node 128 and/or the first node 130 may subscribe to certain types and amounts of services and resources provided by the distributed computing platform 102. For example, the client node 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client node 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
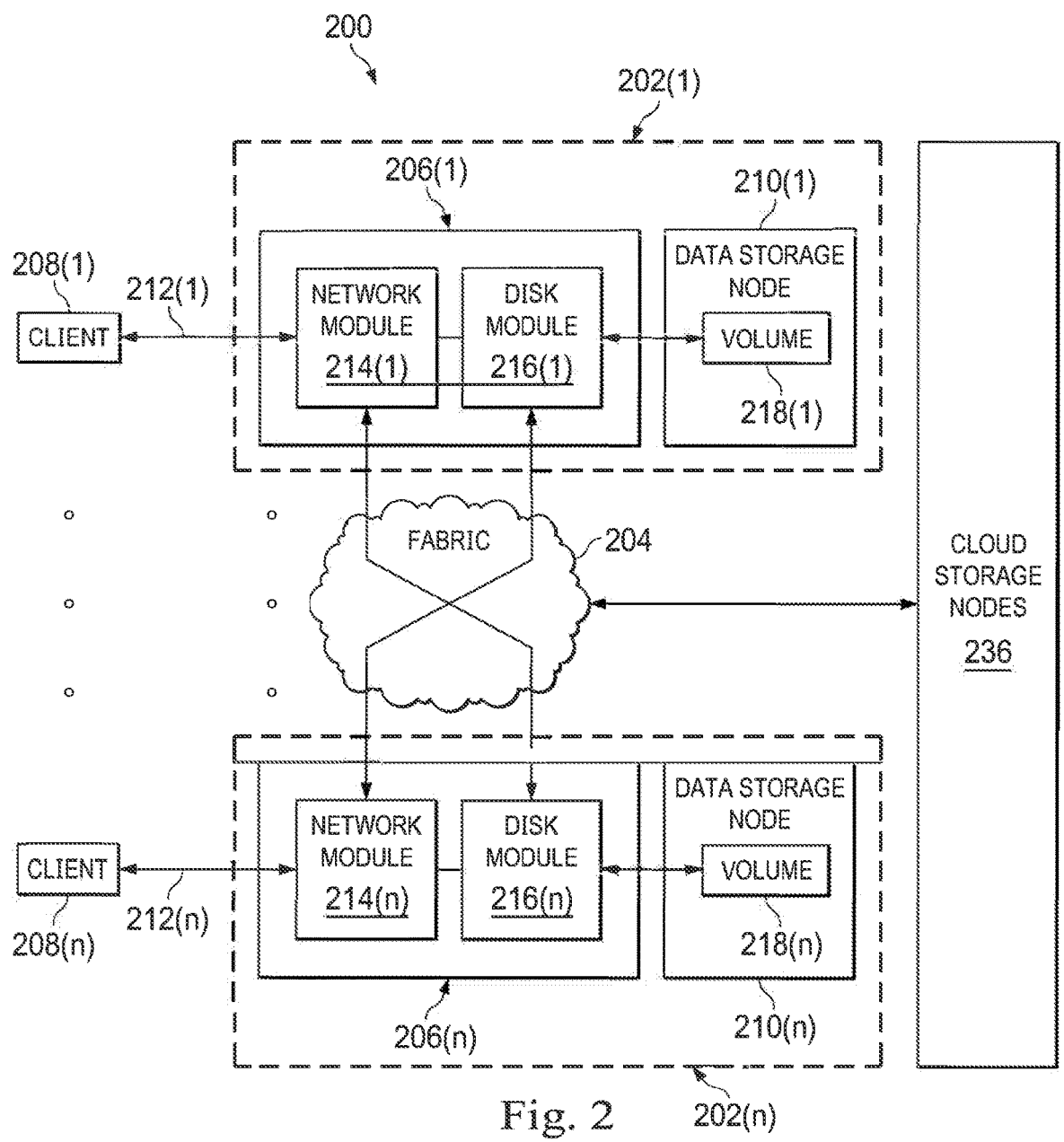
FIG. 2 is a block diagram illustrating a network environment with exemplary node computing devices in accordance with one or more example embodiments.

FIG. 2 is a block diagram illustrating a network environment 200 in accordance with one or more example embodiments. The network environment 200 illustrates another architecture for the principles described above with respect to FIG. 1. Furthermore, the techniques described herein may be implemented with use of a protection agent (such as described with respect to FIG. 3) running in an operating system of a storage node, such as any single or multiple ones of the data storage apparatuses 202(1)-202(n) of FIG. 2.

The network environment 200, which may take the form of a clustered network environment, includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n) (also referred to as node computing devices), for example), although any number of other elements or components can also be included in the network environment 200 in other examples. This technology provides a number of advantages including methods, non-transitory computer-readable media, and computing devices that implement the techniques described herein.

In this example, node computing devices 206(1)-206(n) can be primary or local storage controllers or secondary or remote storage controllers that provide client devices 208(1)-208(n) (also referred to as client nodes) with access to data stored within data storage nodes 210(1)-210(n) (also referred to as data storage devices) and cloud storage node(s) 236 (also referred to as cloud storage device(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage nodes 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage node(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 208(n) with switchover data access to data storage nodes 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the network connections 212(1)-212(n), for example, allowing the client devices 208(1)-208(n) to access data stored in the network environment 200.

Further, the network modules 214(1)-214(n) can provide connections with one or more other components through the cluster fabric 204. For example, the network module 214(1) of node computing device 206(1) can access the data storage node 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage node 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage nodes 210(1)-210(n), such as disks or arrays of disks, SSDs, flash memory, or some other form of data storage, to the node computing devices 206(1)-206(n). Often, disk modules 216(1)-216(n) communicate with the data storage nodes 210(1)-210(n) according to the SAN protocol, such as SCSI or FCP, for example, although other protocols can also be used. Thus, as seen from an operating system on node computing devices 206(1)-206(n), the data storage nodes 210(1)-210(n) can appear as locally attached. In this manner, different node computing devices 206(1)-

206(n), etc. may access data blocks, files, or objects through the operating system, rather than expressly requesting abstract files.

While the network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the network connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage nodes 210(1)-210(n), for example. One or more of the data storage nodes 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage nodes 210(1)-210(n) and one or more of the cloud storage node(s) 236 to provide tiered storage, for example, and other arrangements can also be used in other examples.

In one example, to facilitate access to data stored on the disks or other structures of the data storage nodes 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage nodes 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more LUNs, directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage nodes 210(1)-210(n) can have one or more physical ports, wherein each physical port can be assigned a target address (e.g., SCSI target address). To represent respective volumes, a target address on the data storage nodes 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
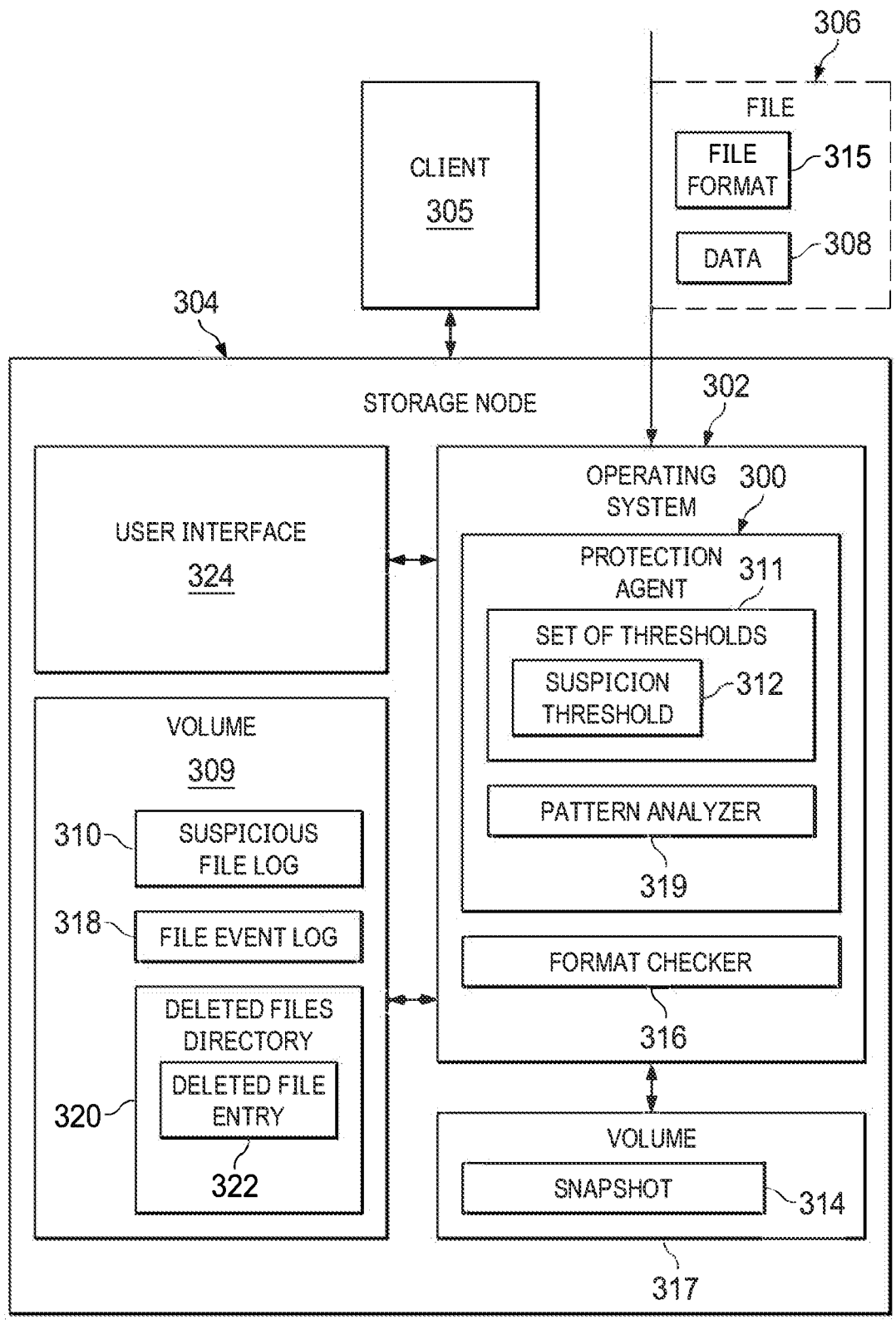
FIG. 3 is a block diagram illustrating a protection agent implemented in an operating system of one or more exemplary nodes in accordance with one or more example embodiments.

FIG. 3 is a block diagram illustrating a protection agent 300 implemented in an operating system 302 of one or more exemplary nodes in accordance with one or more example embodiments. The operating system 302 is a storage operating system that may be hosted by a distributed computing platform such as, for example, distributed computing platform 102 in FIG. 1, or may be installed in one or more data storage apparatuses, such as data storage apparatuses 202(1)-202(n). For example, the operating system 302 may be installed in memory that resides within one or more of the node computing devices 206(1)-206(n), one or more of the data storage nodes 210(1)-210(n), the cloud storage node(s) 236, or a combination thereof.

In one or more examples, the operating system 302 is installed on a storage node 304. The storage node 304 may take the form of, for example, the data storage tier 108 in FIG. 1, one of the data stores in the data storage tier 108 in FIG. 1, one or more of the data storage apparatuses 202(1)-202(b), one of the data storage nodes 210(1)-210(n), one of the cloud storage node(s) 236, or some other type of data storage.

In one or more examples, the data storage node 304 takes the form of an external storage array. In these examples, a client, such as a client 305, may communicate, via one or more intermediaries (e.g., one or more web services, one or more node computing devices such as one or more of the node computing devices 206(1)-206(n), etc.), with the storage node 304 to create, delete, rename, or otherwise modify files that are stored in the storage node 304.

The protection agent 300 monitors generally all file activity associated with the storage node 304 to protect against malware attacks. A malware attack such as, for example, a ransomware attack, may attack a group of files (e.g., 10 files, 50 files, 100 files, 1000 files, 10,000 files, 100,000 files, etc.). For a particular file stored on the storage node 304, a malware attack may attempt to retrieve the file, encrypt data in that file, and write the encrypted data to a new encrypted file on the storage node 304. In many cases, the original file is deleted such that the original file is effectively "replaced" with the new encrypted file. The protection agent 300 works to provide early detection of such a malware attack and mitigation of data loss. The protection agent 300 may, for example, monitor each incoming file request and may intercept each request to write data to the storage node 304 in order to detect and protect against such malware attacks.

For example, for each incoming "write request" that is requesting to write a file to the storage node 304, the protection agent 300 analyzes the data in the file to be written to determine whether that data is encrypted or unencrypted. For example, when the protection agent 300 detects a request to write a file 306 containing data 308 to a volume 309 of the storage node 304, the protection agent 300 analyzes the data 308 to determine whether the data 308 is encrypted or unencrypted. This determination may be made based on chi-square values computed for the data. Chi-square computations are described in more detail with respect to FIG. 8. The data 308 having an encryption state that is "encrypted" may be an indicator that the file 306 to be written is suspicious or, in other words, associated with a malware attack risk (e.g., a ransomware attack risk). A file (e.g., the file 306) that is associated with a malware risk is one that may be considered as being potentially part of a malware attack. If the protection agent 300 determines that the file 306 is suspicious, the protection agent 300 adds an entry to a suspicious file log 310, which may be alternatively referred to as a risk file log or an at-risk file log.

The protection agent 300 tracks the number of entries in the suspicious file log 310 to determine whether the number of suspicious files meets a suspicion threshold 312, which may also be referred to as a risk threshold or at-risk threshold. For example, the suspicion threshold 312 may be a selected number of suspicious files (e.g., 10 20, 100, 500, 1000, or some other number of suspicious files) being added to the suspicious file log 310 within a selected period of time (e.g., 2 seconds, 5 seconds, 30 seconds, 1 minute, 5 minutes, 10 minutes etc.). These two factors, the number of files in the suspicious file log and the period of time, may be selectable by a user or set to any appropriate number. The suspicion threshold 312 may be tuned as appropriate to the specific needs of the entity that owns, controls, and/or uses the storage node 304. For instance, a lower suspicion threshold 312 may lead to false positives, whereas a higher suspicion threshold 312 may delay the discovery of a malware attack, and the threshold may be set as appropriate to a particular application to balance these competing concerns. The suspicion threshold 312 may be one out of a set of thresholds 311 that the protection agent 300 uses to determine whether a malware attack is underway.

The number of entries in the suspicious file log 310 meeting the suspicion threshold 312 may be used as a signal that the storage node 304 is associated with the malware attack risk. This may be a provisional detection of a presence of a malware attack. Accordingly, this signal may trigger the generation of a snapshot 314 of the volume 309 by the protection agent 300. This snapshot 314 is generated to proactively protect the data stored in the volume 309 while the protection agent 300 continues to work to confirm, with an acceptable (e.g., reasonable or tolerable) degree of certainty (e.g., statistical certainty), whether the volume 309 is indeed under attack. The protection agent 300 uses additional evidence to determine whether a malware attack that has been provisionally detected can be confirmed as being underway, thereby making the provisional detection an official or corroborated detection. This corroborated detection may be considered a "confirmation," with an acceptable degree of certainty, that the malware attack is underway. In one or more examples, the snapshot 314 is stored outside of the volume 309. For example, the snapshot 314 may be stored in volume 317 of the storage node 304. In other examples, the snapshot 314 is stored within the volume 309. In still other examples, the snapshot 314 may be stored outside of the storage node 304 in, for example, another storage node that is networked with the storage node 304.

In one or more examples, a format checker 316 is also with the operating system 302. For example, the format checker 316 may be implemented within the operating system 302 and considered separate from the protection agent 300. In other examples, the format checker 316 is considered part of the protection agent 300. In still other example, the format checker 316 may be implemented within the protection agent 300. The format checker 316 may be used as an additional "check" to determine whether the file 306 is suspicious. For example, the format checker 316 may analyze the contents of the file 306 to analyze a recognizability of the file format 315 of the file 306. Recognizable file formats may include, for example, but are not limited to, compressed file formats (e.g., a zip file format, a gzip file format, etc.) and media file formats (e.g., a video file format, an image file format, etc.). In one or more examples, the protection agent 300 may consider the file 306 suspicious (or associated with a malware attack risk) in the event that both the data 308 is determined to be encrypted and the format checker 316 is unable to recognize the file format 315 of the file 306.

The format checker 316 may be used because in some cases, at least some portion of the data 308 in the file 306 that is not actually encrypted may appear to be encrypted when analyzed by the protection agent 300. For example, when the file 306 is a compressed file (e.g., a zip file, a gzip file, etc.) or a media file (e.g., a video file, an image file, etc.), at least a portion of the data 308 in the file 306 that is actually unencrypted may appear to be encrypted. The format checker 316 is used to ensure that such files do not get flagged as suspicious. In one or more examples, the format checker 316 performs this check of the file 306 regardless of whether the data 308 in the file 306 has been flagged as encrypted. In other examples, the format checker 316 is used to perform the check after the data 308 has been flagged as encrypted but prior to a corresponding entry being added to the suspicious file log 310. The corresponding entry is then added if the format checker 316 is unable to recognize the file format 315 of the file 306. In still other examples, the format checker 316 performs the check after the corresponding entry for the file 306 has been added to the suspicious file log 310. In one or more examples, the snapshot 314 may be created after the format checker 316 performs its check and may provide another level of evidence that the data 308 is encrypted.

The protection agent 300 also maintains a file event log 318 that tracks file events. For example, the file event log 318 tracks when a file is created, deleted, renamed, truncated, or controlled in some other manner. This type of tracking of file activity allows the protection agent 300 to monitor for an irregular pattern or behavior that would be expected from a malware attack.

In one or more examples, the protection agent 300 uses pattern analyzer 319 to analyze the suspicious file log 310, the file event log 318, or both to determine whether the provisional detection can be corroborated and thereby confirm, with an acceptable degree of certainty, that a malware attack is underway whether a malware attack is underway. The pattern analyzer 319 evaluates the file activity over a plurality of files stored in the volume 309 (e.g., by reference to the file event log 318) to determine whether the volume 309 has a malware attack underway. The pattern analyzer 319 looks for irregular patterns or behavior that align with the expected pattern or behavior of a malware attack.

For example, the pattern analyzer 319 may include a plurality of templates, each corresponding to a profile of a malware attack. These templates may be uploaded by an administrator, a program, a service, some other template provider, or a combination thereof. In one or more examples, a new template may be uploaded for use by the pattern analyzer 319 when a new type of malware attack (e.g., ransomware attack) is identified or when new malware characteristics are identified. In some cases, one or more templates may be updated over time as new information about malware attacks is gathered over time. The file analyzer 319 may look for activity that matches one or more templates of this plurality of templates. Irregular file activity may include, for example, accessing multiple files within a short period of time, where those files have no known correlation and are rarely accessed. In another example, the pattern analyzer 319 may look for an unusual amount of file deletion and file creation activity within a certain period of time as an indicator of a malware attack. The pattern analyzer 319 may increase the chances of detecting a malware attack and may reduce the number of false positives that would otherwise be produced by the protection agent 300. Of course, any kind of pattern template may be used to model suspicious behavior, and the patterns may be developed using known attacks, simulated attacks, or any other appropriate input. Also, the scope of embodiments is not limited to using templates, as some embodiments may employ a trained artificial intelligence application that monitors use in real time and flags use that the trained model considers suspicious.

Further, the protection agent 300 may also maintain a deleted files directory 320, which is stored in the volume 309. In other examples, the deleted files directory 320 may be stored in a different volume, such as the volume 317. Any file that is deleted from the volume 309 as a result of a delete request may be preserved via, for example, a deleted file entry 322 in the deleted files directory 320. In one or more examples, the deleted file entry 322 is preserved for a selected period of time that may be preselected by, for example, a storage administrator or other user. In some examples, one or more other factors may be additionally or alternatively used to determine the amount of time for which the deleted file entry 322 is preserved. These one or more other factors may include, for example, without limitation, the amount of free space available in the volume 309, the amount of space reserved for the deleted files directory 320 within the volume 309, one or more other factors, or a combination thereof.

When the protection agent 300 has made a corroborated detection of a malware attack (e.g., confirmed that a malware attack is underway with an acceptable degree of certainty), the protection agent 300 uses the suspicious file log 310, the file event log 318, or both to identify the one or more files that are potentially impacted. In one or more examples, the protection agent 300 employs a user interface 324 that is displayed on client 305 to present information about the one or more files that are potentially impacted to, for example, the storage administrator. The protection agent 300 may also identify and present recovery options for the one or more files that are potentially impacted. More particularly, the protection agent 300 may be configured to provide a recovery option for each individual file that is identified as being impacted by the malware attack (e.g., an original file that had its data encrypted, an original file that was deleted after its data was encrypted, etc.). The protection agent 300, the storage administrator, or a combination of the two may determine whether a given impacted file should be restored from a snapshot or from the deleted files directory 320. For example, if the deleted files directory 320 contains a version of the impacted file at a timepoint that is closer to when the malware attack is determined to have begun or when the malware attack was detected as compared to the snapshot, the impacted file may be restored from the deleted files directory 320.

In one or more examples, the protection agent 300 uses the suspicious file log 310, the file event log 318, or both to identify the source of the malware attack. For example, the protection agent 300 may identify a client or computing device on which the malware (e.g., ransomware) is running based on the information identified in the suspicious file log 310, the file event log 318, or both.

Thus, the protection agent 300 enables a malware attack to be quickly and easily detected while also allowing for mitigation of data loss. The protection agent 300 works at the level of the operating system 302 to ensure that a malware attack does not escape detection and is tracked at the lowest level of the data write path. Such features may improve operation of a computer (e.g., storage node 304) by increasing data integrity, which may improve the operational availability of the computer.

Figure 4:
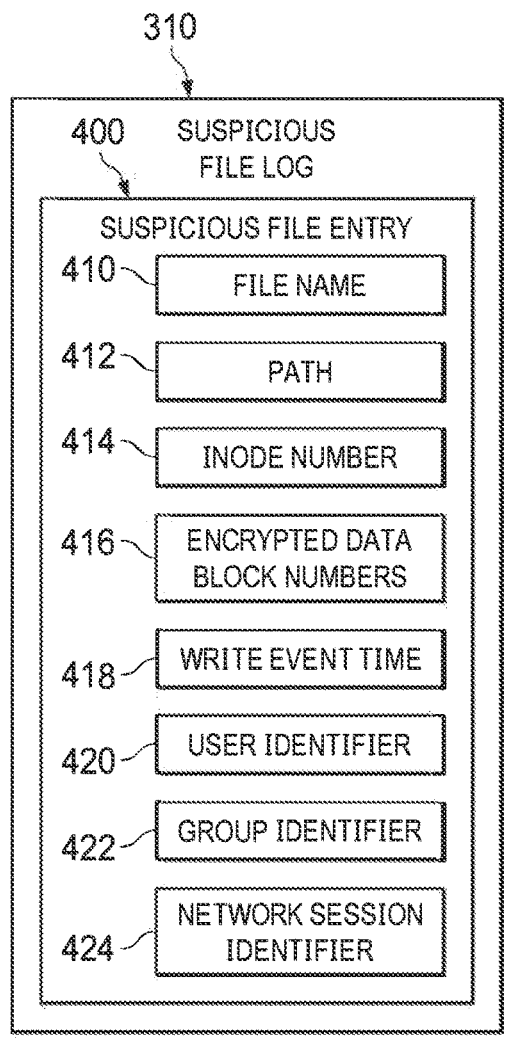
FIG. 4 is a block diagram illustrating a suspicious file entry in a suspicious file log in accordance with one or more example embodiments.

FIG. 4 is a block diagram illustrating a suspicious file entry 400 in the suspicious file log 310 in accordance with one or more example embodiments. The suspicious file entry 400 may be an example of one of the entries that may be added to the suspicious file log 310 described in connection with FIG. 3. For example, the suspicious file entry 400 may be the entry added to the suspicious file log 310 in response to a determination that the file 306 described above is suspicious. The suspicious file entry 400 includes a number of fields containing information related to the file 406. For example, the suspicious file entry 400 may include one or more of the following fields: file name 410, path 412, inode number 414, encrypted data block numbers 416, write event time 418, user identifier (UID) 420, group identifier (GID)

422, and network session identifier 424, though any appropriate number or type of fields may be used.

The file name 410 is the name of the file 306. The path 412 identifies a unique file system location for the file 306. The inode number 414 is the inode number corresponding to the file 306. The encrypted data block numbers 416 identifies the file block numbers corresponding to the file blocks flagged as encrypted and therefore suspicious. The write event time 418 identifies the time at which the write request was generated or received. The UID 420 and/or the GID 422 identify the user, client, or system that generated the write request. The network session identifier 424 identifies the network session over which the write request was received.

Information in any of the fields may be displayed to an administrator by, for example, the user interface 324, to assist the administrator in confirming whether a malware attack is underway and how to respond. Additionally, one or more of the fields may be used by the protection agent 300 to suggest options to the administrator (e.g., by displaying via the user interface 324) for protecting against the malware attack or for fixing the file 306. For example, the inode number 414 may be matched to a snapshot or another copy of the data, thereby allowing the snapshot or other copy to be used as an alternative to data that may be surreptitiously encrypted. In some examples, the UID 420, the GID 422, the network session identifier 424, or a combination thereof may be presented to the administrator via, for example, the user interface 324, to allow the administrator to identify the source (e.g., computing system or client) of the malware attack. In one or more examples, an identification of the source may be used to block any further file requests from the source, may be included in an alert and/or a report generated in response to the corroborated detection of the malware attack, may be used in one or more mitigation techniques, or a combination thereof.

Figure 5:
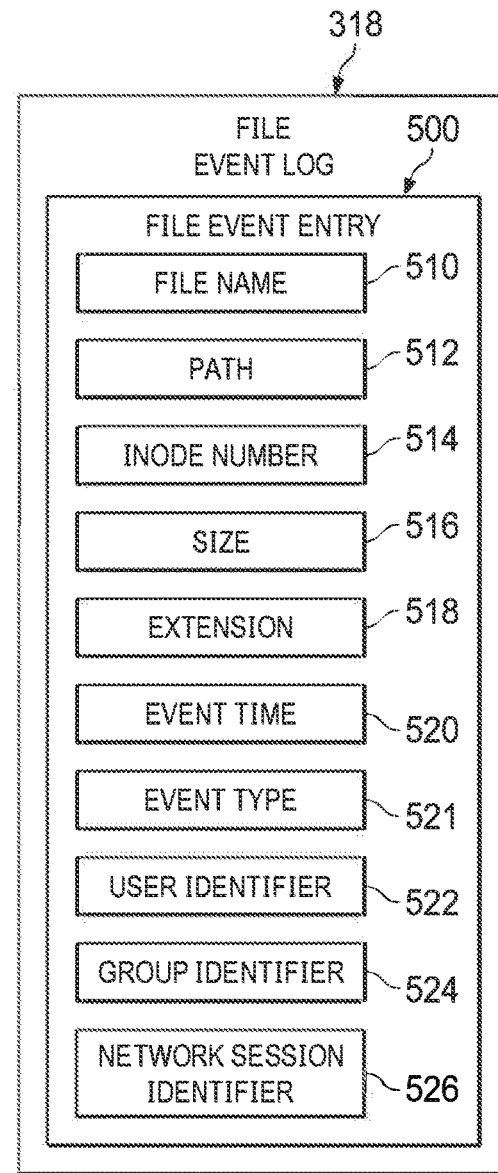
FIG. 5 is a block diagram illustrating a file event entry in a file event log in accordance with one or more example embodiments.

FIG. 5 is a block diagram illustrating a file event entry 500 in the file event log 318 in accordance with one or more example embodiments. The file event entry 500 may be an example of one of the entries that may be added to the file event log 318 described in connection with FIG. 3. For example, the file event entry 500 may be added to the file event log 318 in response to a deletion, renaming, or other modification of a file stored in the volume 309 described above with respect to FIG. 3. The file event entry 500 includes a number of fields related to that file. For example, the file event entry 500 may include one or more of the following fields: file name 510, path 512, inode number 514, size 516, extension 518, event time 520, event type 521, user identifier (UID) 522, group identifier (GID) 524, and network session identifier 526.

The file name 510 is the name of the file. The path 512 identifies a unique file system location for the file. The inode number 514 is the inode number corresponding to the file. The size 516 identifies the file size in bytes, kilobytes, megabytes or some other unit. The extension 518 identifies a characteristic of the file contents or its intended use. The event time 520 identifies the time of the event for which the file event entry 500 is created. The event type 521 identifies the type of event, which may be, for example, but is not limited to, a create or write request, a delete request, a rename request, a truncation, some other type of modification request, or some other type of file-related event. The UID 522 and/or the GID 524 identify the user, client, or system that generated the file request. The network session identifier 526 identifies the network session over which the write request was received.

Information in any of the fields may be displayed to an administrator by, for example, the user interface 324, to assist the administrator in confirming whether an attack is underway and how to respond. Additionally, one or more of the fields may be used by the protection agent 300 to suggest options to the administrator for protecting against the malware attack or fixing the file 306. For example, the inode number 514 associated with an entry in the file event log 318 corresponding to a request to delete a file may be matched to a snapshot or another copy of the data contained in that file prior to any malware encryption or deletion, thereby allowing the snapshot or other copy to be used as an alternative to the data. In some examples, the UID 522, the GID 524, the network session identifier 526, or a combination thereof may be presented to the administrator via, for example, the user interface 324, to allow the administrator to identify the source (e.g., computing system or client) of the malware attack.

In this manner, the suspicious file log 310 as described with respect to FIGS. 3 and 4, the file event log 318 as described with respect to FIGS. 3 and 5, or both may be used to mitigate data loss and/or identify the source of a malware attack. The suspicious file log 310 may track suspicious write requests while the file event log 318 may track all file activity so that suspicious write activity may be associated with other related suspicious file activity.

Figure 6:
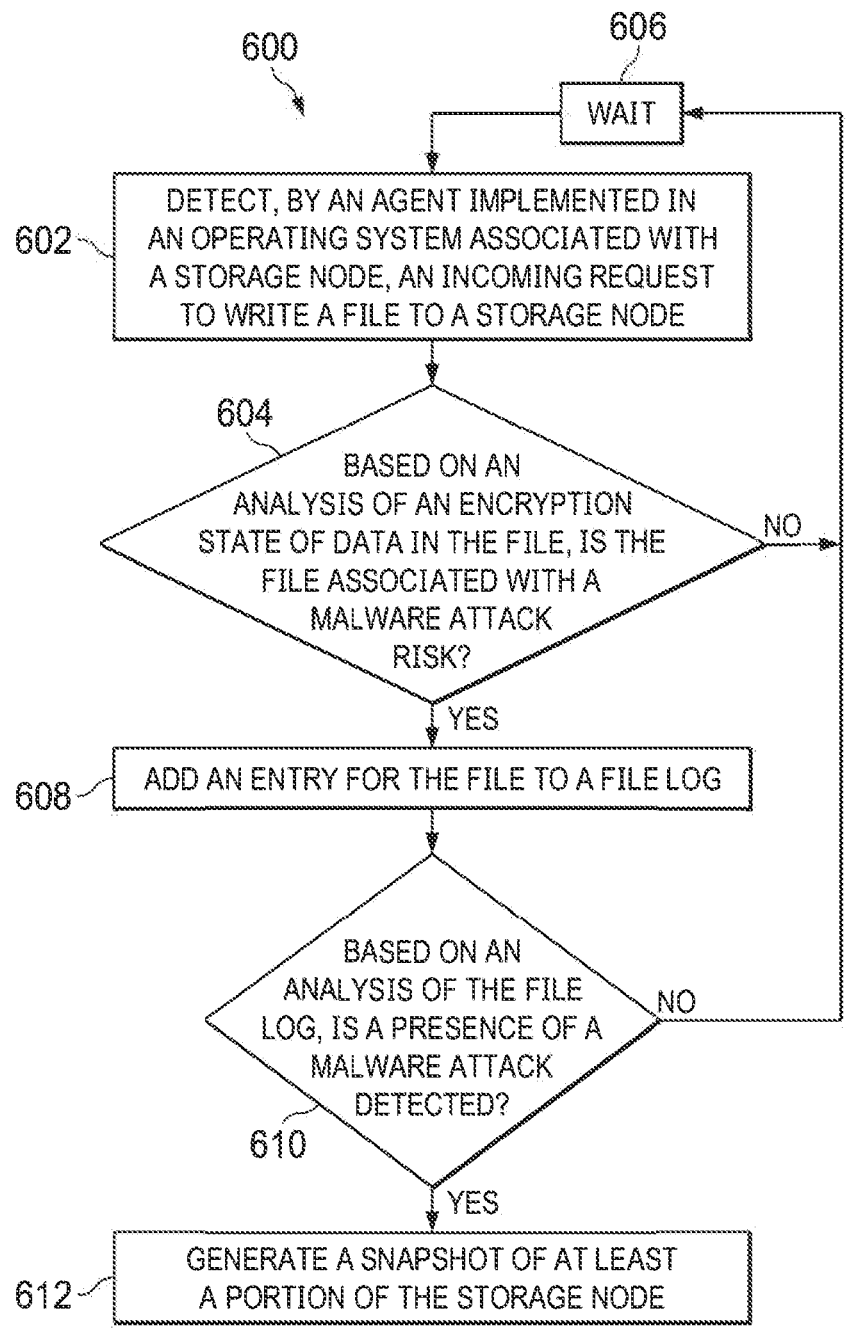
FIG. 6 is a flow diagram of a process for protecting a storage node against a malware attack in accordance with one or more example embodiments.

FIG. 6 is a flow diagram of a process for 600 for protecting a storage node against a malware attack in accordance with one or more example embodiments. The process 600 may be implemented by one or more processors of a data storage apparatus, such as one of the data storage apparatuses 202(1)-202(n) described in connection with FIG. 2 executing computer-readable instructions from one or more computer-readable media to perform the functions described herein. In one or more examples, the process 600 may be implemented by one or more processes of a storage node, such as the storage node 304 described in connection with FIG. 3 executing computer-readable instructions from one or more computer-readable media to perform the functions described herein. For example, the process 600 may be implemented using the protection agent 300 described in connection with FIG. 3. It is understood that additional actions or operations can be provided before, during, and after the actions or operations of the process 600, and that some of the actions or operations described can be replaced or eliminated in other embodiments of the process 600.

The process 600 may begin by detecting, by an agent implemented in an operating system associated with a storage node, an incoming request to write a file to a storage node (operation 602). The incoming request, which may be referred to as a write request, may be to write the file to a particular volume of the storage node such as, for example, the volume 309 of the storage node 304 described in connection with FIG. 3. The agent may be, for example, the protection agent 300 described in connection with FIGS. 3 and 4.

The process 600 then determines whether the file is associated with a malware attack risk based on an analysis of an encryption state of data in the file (operation 604). In other words, a determination may be made as to whether the file is suspicious based on an analysis of whether data in the file is encrypted or unencrypted. The data may be analyzed in a number of different ways. In one or more examples, chi-square computations are performed to determine whether the data in the file is encrypted or unencrypted. For example, a plurality of chi-square values may be computed for data blocks of the file with respect to one or more levels of granularity. Chi-square computations are described in more detail with respect to FIG. 8. This determination is made at the level of the operating system, which is the bottommost layer or level in the data write path. Accordingly, data that is encrypted is considered as being encrypted due to malware. When the data in the file is determined to be encrypted, the file is flagged as being suspicious or, in other words, as potentially being part of a malware attack.

If a determination is made that the file is not associated with a malware attack risk, the process 600 waits (operation 606) until another incoming request to write a file is received, returning to operation 602 as described above. If, however, a determination is made that the file is associated with a malware attack risk, an entry for the file is added to a file log (operation 608). This file log may be, for example, the suspicious file log 310 described above in connection with FIG. 3. The entry added to this file log may include, for example, at least a portion of the information described in connection with the suspicious file entry 400 in FIG. 4. In one or more examples, the entry includes at least an inode number corresponding to the file, a file path corresponding to the file, and a list of data block numbers that identify the data blocks in the file that have been identified as encrypted and therefore flagged or marked as suspicious.

A determination is made, based on an analysis of the file log, as to whether a presence of a malware attack is detected (operation 610). This detection in operation 610 is a provisional detection. This analysis of the file log in operation 610 may be performed in a number of different ways. In one or more examples, the suspicious file log may be analyzed to determine whether the number of entries added to the file log (e.g., suspicious file log 310) within a selected period of time has met a threshold (e.g., suspicion threshold 312). If this threshold is met, a determination may be made that a presence of a malware attack is detected. In other words, because the presence of a malware is suspected based on the file log, a "provisional detection" of the presence of a malware attack is made.

If a presence of a malware attack is not detected, the process 600 returns to operation 606 described above. If, however, a presence of a malware attack is detected, a snapshot of at least a portion of the storage node is generated (operation 612). The snapshot may be, for example, of a particular volume in the storage node. This snapshot helps ensure no further data loss if a malware attack is indeed later confirmed. In other examples, the snapshot may be of multiple volumes in the storage node.

Figure 7:
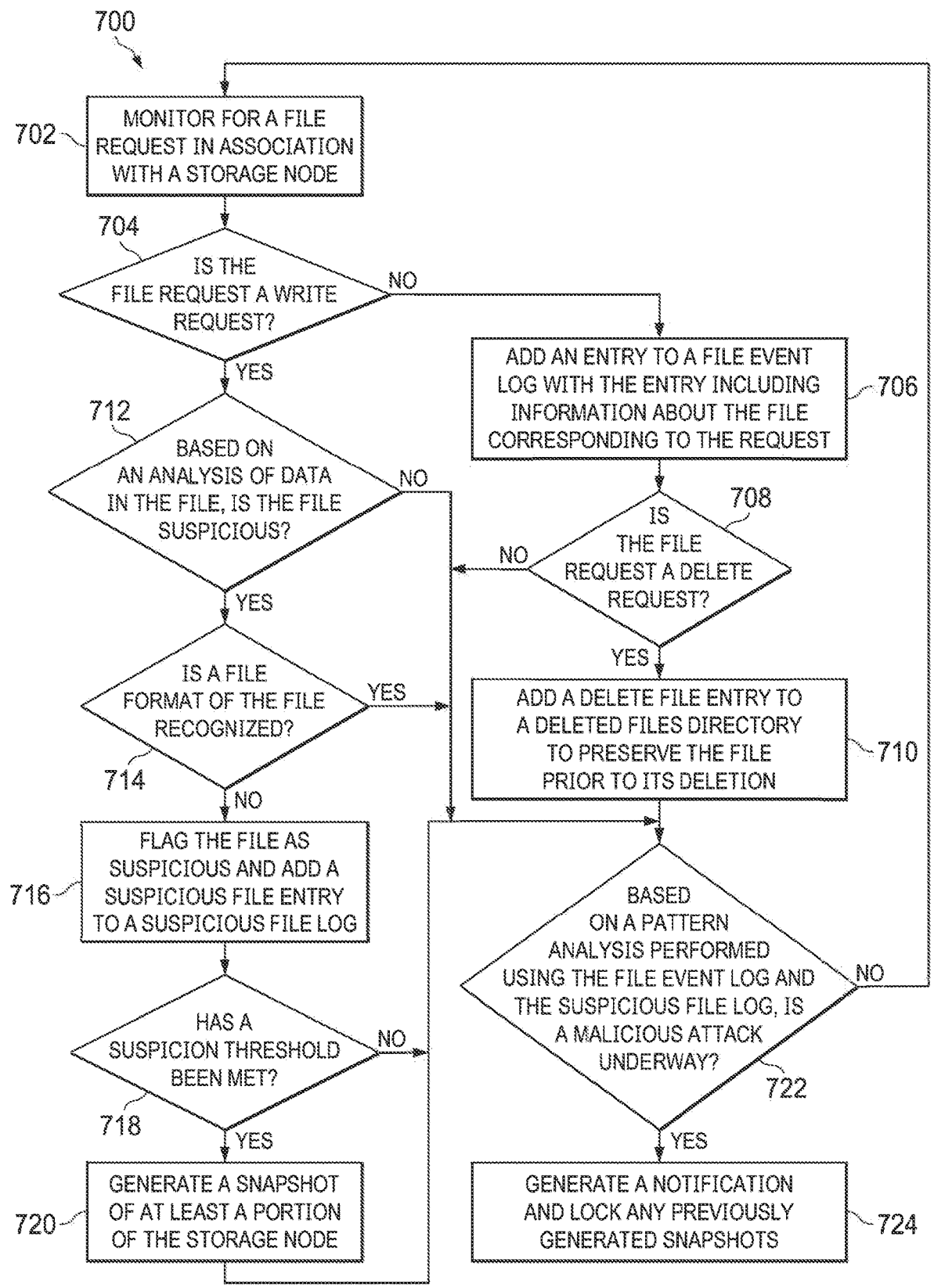
FIG. 7 is a flow diagram of a process for protecting a storage node against a malware attack in accordance with one or more example embodiments.

FIG. 7 is a flow diagram of a process for 700 for protecting a storage node against a malware attack in accordance with one or more example embodiments. The process 700 may be implemented by one or more processors of a data storage apparatus, such as one of the data storage apparatuses 202(1)-202(n) described in connection with FIG. 2 executing computer-readable instructions from one or more computer-readable media to perform the functions described herein. In one or more examples, the process 700 may be implemented by one or more processes of a storage node, such as the storage node 304 described in connection with FIG. 3 executing computer-readable instructions from one or more computer-readable media to perform the functions described herein. For example, the process 700 may be implemented using the protection agent 300 described in connection with FIG. 3. It is understood that additional actions or operations can be provided before, during, and after the actions or operations of the process 700, and that some of the actions or operations described can be replaced or eliminated in other embodiments of the process 700. The process 700 described in FIG. 7 is a more detailed process for protecting a storage node against a malware attack than the process 600 described above in connection with FIG. 6 and includes additional actions that enable confirming, with an acceptable degree of certainty, whether a provisional detection of a malware attack can indeed be confirmed.

The process 700 may begin by monitoring for a file request in association with a storage node (operation 702). The file request may be, for example, a write request, a delete request, a truncation request, a renaming request, or some other type of request.

In response to receiving a file request, a determination is made as to whether the file request is a write request to write a file to the storage node (operation 704). If the file request is not a write request, an entry is added to a file event log with the entry including information about the file corresponding to the request (operation 706).

A determination is made as to whether the request is a delete request (operation 708). For example, a delete request may be a request to delete a file from the storage node. If the request is not a delete request, the process proceeds to operation 722 described below. Otherwise, a delete file entry is added to a deleted files directory to preserve the file prior to its deletion (operation 710), with the process then proceeding to operation 722 as described below. In one or more examples, with respect to operation 710, the file corresponding to the delete request may be marked deleted but preserved via a link to the file in the deleted files directory. In other examples, the deleted files directory may be a database in which the file is stored prior to its deletion from its original location with respect to the storage node.

With respect again to operation 704, if, however, the file request is a write request, an analysis of data in the file is performed to determine whether the file is suspicious (operation 712). This analysis may be performed using, for example, chi-square computations that help evaluate whether the data in the file has a byte frequency distribution that is similar to one that would be expected of malware (or encrypted) data. Chi-square computations are described in more detail with respect to FIG. 8.

If the file is determined to be suspicious, a determination is made as to whether a file format of the file is recognized (operation 714). Operation 714 may be performed using, for example, a format checker that analyzes the contents of the file to thereby analyze a recognizability of the file format of the file. For example, the format checker may analyze the file to determine whether the file format is one of a collection of known file formats.

If the file format is not recognized, the file is flagged as suspicious and a suspicious file entry is added to a suspicious file log (operation 716). A determination is then made as to whether a suspicion threshold has been met (operation 718). This suspicious threshold is used to determine whether a malware attack is suspected. More particularly, the suspicion threshold is used to "provisionally detect" a malware attack. If a suspicion threshold has not been met, the process 700 proceeds to operation 722 described below. If, however, a suspicion threshold has been met, the process 700 generates a snapshot of at least a portion of the storage node (operation 720). This snapshot is performed if a malware attack is suspected, based on the suspicion threshold, so as to prevent any further data loss. In one or more examples, the snapshot is of the volume to which the file was to be written.

The process 700 then determines whether a malware attack is underway based on a pattern analysis performed using the file event log and the suspicious file log (operation 722). Operation 722 may be used to determine whether a provisional detection of the malware attack in operation 718 can indeed be confirmed as a malware attack within an acceptable degree of certainty. If a malware attack is not confirmed as being underway, the process 700 returns to operation 702 described above. Otherwise, if the malware attack is confirmed as being underway, a notification is generated, and any previously generated snapshots are locked (operation 724). In other examples, only the most recent snapshot or recent few snapshots may be locked. In one or more examples, the notification that is generated may be visually presented via a user interface to, for example, a storage administrator, to allow the user to determine whether to restore any impacted files from one or more of the previously generated snapshots or from the deleted files directory.

With reference again to operation 714, if the file format is recognized, the process 700 proceeds to operation 722 described above. With reference again to operation 712, if the file is not determined to be suspicious, the process proceeds to operation 722 described above.

FIG. 8 is a flow diagram of a process for determining whether a file is suspicious in accordance with one or more example embodiments. The process 800 may be used to implement the operations 604 in FIGS. 6 and 712 in FIG. 7. The process 800 may be implemented by one or more processors of a data storage apparatus, such as one of the data storage apparatuses 202(1)-202(n) described in connection with FIG. 2 executing computer-readable instructions from one or more computer-readable media to perform the functions described herein. In one or more examples, the process 800 may be implemented by one or more processes of a storage node, such as the storage node 304 described in connection with FIG. 3 executing computer-readable instructions from one or more computer-readable media to perform the functions described herein. For example, the process 800 may be implemented using the protection agent 300 described in connection with FIG. 3. It is understood that additional actions or operations can be provided before, during, and after the actions or operations of the process 800, and that some of the actions or operations described can be replaced or eliminated in other embodiments of the process 800. The process 800 may be implemented while a particular client session is active (e.g., a particular file is open).

The process 800 may begin by receiving a data block of a first level of granularity as part of a write request (operation 802). The data block may be one that is to be written to a file in a storage node. The first level of granularity refers to a size of the data block. The data block may be, for example, a 4-kilobyte (4K) block. A 4-kilobyte block comprises 4096 bytes. But any appropriate level of granularity may be used within the scope of embodiments.

A chi-square value is computed for the data block (operation 804). The chi-square value may be computed as follows:

$$\text{Chi-square} = X^2 = \Sigma_{i=0}^{255} (O_i - E_i)^2 / E_i \quad (1)$$

where O is the observed value and E is the expected value, with respect to the frequencies of ASCII characters in the data block. The expected value is based on a uniform distribution of ASCII characters expected from a file that is encrypted, or random. A low chi-square value indicates a high correlation between the two datasets being compared. Here, the chi-square value is being used to compare the contents of the distribution of the file of interest to the uniform distribution expected for an encrypted file.

A determination is made as to whether the chi-square value is below a selected chi-square threshold (operation 806). The selected chi-square threshold may be an example of one threshold in the set of thresholds 311 described in connection with FIG. 3. In one or more examples, the selected chi-square threshold may be, for example, a value between about 330 and about 420. An example file can have byte values that range from 0-255, though any range of byte values may be within the scope of embodiments. For random data (e.g., encrypted data), the chi-square value may not exceed 330. Thus, an encrypted file is expected to have a chi-square value below about 330. But the selected chi-square threshold may be set to a higher value (e.g., 400) to reduce the number of false negatives.

With reference to operation 806, if the chi-square value is not below the selected chi-square threshold, an unencrypted block counter is incremented (operation 808), with the process 800 returning to operation 802 described above. If, however, the chi-square is below the selected chi-square threshold, the byte frequency distribution (BFD) of that data block is added to a histogram array (operation 810).

A determination is then made as to whether data stored in the histogram array has reached a second level of granularity (operation 811). This second level of granularity may be larger than the first level of granularity, for example, a 64-kilobyte (64K) data block that comprises 65,536 bytes. For example, the data in the histogram array may reach the second level of granularity when 16 4K data blocks have been added to the histogram array. But any appropriate level of granularity may be used within the scope of embodiments. If the second level of granularity has not been reached, the process 800 returns to operation 802 described above. Otherwise, a chi-square value is computed for the data block having the second level of granularity (operation 812).

A determination is made as to whether the chi-square value computed at operation 812 is below a selected chi-square threshold (operation 814). The selected chi-square threshold in operation 814 may be the same as or different from the selected chi-square threshold described in operation 806 above. If the chi-square value is not below the selected chi-square threshold, the unencrypted block counter is incremented (operation 816), with the process 800 then returning to operation 802 described above. In one or more examples, in operation 816, the unencrypted block counter is incremented by a number indicating the ratio of the second level of granularity to the first level of granularity. For example, when the second level of granularity is 64K and the first level of granularity is 4 k, the ratio may be 16:1. Accordingly, the unencrypted block counter may be incremented by 16, indicating that 16 4K blocks were determined to be unencrypted.

With reference again to operation 814, if the chi-square value is below the selected chi-square threshold, an encrypted block counter is incremented (operation 818). The encrypted block counter may also be incremented by the number indicating the ratio of the second level of granularity to the first level of granularity.

A determination is made as to whether the number of encrypted blocks exceeds an encrypted threshold (operation 820). The encrypted threshold may be an example of one threshold in the set of thresholds 311 described in connection with FIG. 3. In one or more examples, with respect to operation 820, the encrypted threshold may be a selected percentage of blocks out of the total number of blocks of the file that are determined to be encrypted. This percentage may be, for example, about 70 percent. But the encrypted threshold may be tuned as appropriate such that the percentage is selected as a value between about 50 percent and 90 percent in other examples.

If the number of encrypted blocks does not exceed the encrypted threshold, the process 800 returns to operation 802 described above. Otherwise, the file is flagged as suspicious (operation 822). In this manner, the process 800 described by operations 802-820 may be repeated as needed until the file is flagged as suspicious in operation 822. Additionally, and/or alternatively, the operations 800-820 may be repeated until no more data blocks of the file being written are received for writing to the storage node (e.g., the client session expires, the file is closed, etc.). Thus, in one or more examples, the process 800 may include one or more actions that monitor whether the client session expires during the process 800 or whether the file has been closed during the process 800. For either instance, the process 800 may terminate.

In one or more examples, another computation may be performed for a third level of granularity to provide a confirmation of encryption. Optionally, after the file has been flagged as suspicious, a confirmation action is performed by computing a chi-square value for the byte frequency distribution over the entire file, excluding the data blocks previously determined to be unencrypted, (operation 824). The file is confirmed as suspicious if this chi-square value is less than the chi-square threshold and unflagged as suspicious if the chi-square value is not less than the chi-square threshold.

As a result of the elements discussed above, examples of the present disclosure improve the detection of malware attacks, such as ransomware attacks, and improve data loss mitigation. The methods, systems, and machine-readable media described above provide techniques for distinguishing incoming data as encrypted versus unencrypted at the level of the operating system on the storage node. Further, overall file activity is observed to determine whether an irregular pattern or irregular behavior that is consistent with malware behavior is detected.

The present embodiments can take the form of an entirely hardware embodiment, an entirely software embodiment, or an embodiment containing both hardware and software elements. Accordingly, it is understood that any operation of the computing systems of the computing environment 100, the network environment 200, and the storage node 304 may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
analyzing, by a protection agent implemented at an operating system level of a storage node, data in a file associated with a write request to the storage node to determine whether the file is associated with a malware attack risk, the analysis comprising:
in response to a first chi-square value for a first data block from the data in the file at a first level of granularity being below a first threshold, adding a byte frequency distribution of contents of the first data block to an array;
in response to a second chi-square value for a second data block from the data in the file at a second level of granularity being below a second threshold, associating the file with the malware attack risk,
wherein the second level of granularity is greater than the first level of granularity and the second data block includes a plurality of data blocks represented by the array; and
detecting a presence of a malware attack based on a number of data blocks at the second level of granularity, including the second data block, being above an encryption threshold amount.

2. The method of claim 1, wherein the second data block includes the first data block represented by the array.

3. The method of claim 1, wherein the first threshold and the second threshold comprise a common value.

4. The method of claim 1, wherein the first threshold and the second threshold are different from each other.

5. The method of claim 1, further comprising:
adding, by the protection agent, an entry for the file to a file log in response to associating the file with the malware attack risk.

6. The method of claim 5, further comprising:
confirming, by the protection agent, that the malware attack is underway based on a pattern analysis performed using the file log and a file event log that tracks file activity.

7. The method of claim 1, further comprising:
generating a snapshot of a volume to which the file was to be written in response to the detecting the presence of the malware attack.

8. A storage node comprising:
a memory containing machine-readable medium comprising machine-executable code having stored thereon instructions for performing a method of malware attack detection by a protection agent implemented at an operating system level of the storage node; and
a processor coupled to the memory, the processor configured to execute the machine-executable code to:
analyze data in a file associated with a write request to the storage node to determine whether the file is associated with a malware attack risk, the analysis comprising:
in response to a first chi-square value for a first data block from the data in the file at a first level of granularity being below a first threshold, add a byte frequency distribution of contents of the first data block to an array;
in response to a second chi-square value for a second data block from the data in the file at a second level of granularity being below a second threshold, associate the file with the malware attack risk,
wherein the second level of granularity is greater than the first level of granularity and the second data block includes a plurality of data blocks represented by the array;

detect a presence of a malware attack based on a number of data blocks at the second level of granularity, including the second data block, being above an encryption threshold amount; and generate a snapshot of a volume to which the file was to be written in response to the detection of the presence of the malware attack.

9. The storage node of claim 8, wherein the second data block includes the first data block represented by the array.

10. The storage node of claim 8, wherein the first threshold and the second threshold comprise a common value.

11. The storage node of claim 8, wherein the first threshold and the second threshold are different from each other.

12. The storage node of claim 8, wherein the processor is configured to:

add an entry for the file to a file log in response to associating the file with the malware attack risk; and confirm that the malware attack is underway based on a pattern analysis performed using the file log and a file event log that tracks file activity.

13. The storage node of claim 12, wherein the processor is further configured, as part of the detection of the presence of the malware attack, to:

determine that a number of files added to the file log, which includes the entry for the file, within a period of time meets a time threshold.

14. The storage node of claim 8, wherein the processor is further configured, as part of the detection of the presence of the malware attack, to:

detect the presence of the malware attack at least in part based on determining that a file format of the file is unrecognizable.

15. A non-transitory machine-readable medium containing instructions for performing a method by a protection agent operating at an operating system level of a storage node, wherein the instructions, when executed by a processor of the storage node, cause the storage node to determine that a file associated with a volume of the storage node has a malware attack risk based on an analysis of an encryption state of data in the file, including causing the storage node to:

analyze data in the file, which is associated with a write request to the storage node, to determine whether the file is associated with the malware attack risk, the analysis comprising:

in response to a first chi-square value for a first data block from the data in the file at a first level of granularity being below a first threshold, add a byte frequency distribution of contents of the first data block to an array;

in response to a second chi-square value for a second data block from the data in the file at a second level of granularity being below a second threshold, associate the file with the malware attack risk, wherein the second level of granularity is greater than the first level of granularity and the second data block includes a plurality of data blocks represented by the array;

detect a presence of a malware attack based on a number of data blocks at the second level of granularity, including the second data block, being above an encryption threshold amount; and generate a snapshot of the volume to which the file was to be written in response to the detection of the presence of the malware attack.

16. The non-transitory machine-readable medium of claim 15, wherein the second data block includes the first data block represented by the array.

17. The non-transitory machine-readable medium of claim 15, wherein the first threshold and the second threshold comprise a common value.

18. The non-transitory machine-readable medium of claim 15, wherein the first threshold and the second threshold are different from each other.

19. The non-transitory machine-readable medium of claim 15, wherein the instructions cause the storage node to:

add an entry for the file to a file log in response to associating the file with the malware attack risk; and confirm that the malware attack is underway based on a pattern analysis performed using the file log and a file event log that tracks file activity.

20. The non-transitory machine-readable medium of claim 19, wherein the instructions cause the storage node, as part of the detection of the presence of the malware attack, to:

determine that a number of files added to the file log, which includes the entry for the file, within a period of time meets a time threshold.

* * * * *